(12) United States Patent
Shimatani

(10) Patent No.: US 11,297,198 B2
(45) Date of Patent: Apr. 5, 2022

(54) IMAGE PROCESSING APPARATUS

(71) Applicant: KYOCERA Document Solutions Inc., Osaka (JP)

(72) Inventor: Akira Shimatani, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/168,348

(22) Filed: Feb. 5, 2021

(65) Prior Publication Data

US 2021/0250462 A1 Aug. 12, 2021

(30) Foreign Application Priority Data

Feb. 6, 2020 (JP) .............................. JP2020-019060

(51) Int. Cl.
*H04N 1/40* (2006.01)
*H04N 1/00* (2006.01)
*H04N 1/409* (2006.01)

(52) U.S. Cl.
CPC ......... *H04N 1/00933* (2013.01); *H04N 1/409* (2013.01); *H04N 1/40056* (2013.01)

(58) Field of Classification Search
None
See application file for complete search history.

(56) References Cited

U.S. PATENT DOCUMENTS

| 2011/0181921 | A1* | 7/2011 | Fukutome | G03G 15/50 358/474 |
| 2012/0062962 | A1* | 3/2012 | Nagase | H04N 1/40056 358/463 |
| 2015/0281503 | A1* | 10/2015 | Hori | H04N 1/028 358/509 |
| 2021/0099614 | A1* | 4/2021 | Ozaki | H04N 1/409 |
| 2021/0099661 | A1* | 4/2021 | Shimatani | H04N 5/3572 |

FOREIGN PATENT DOCUMENTS

| JP | 2014-236335 | 12/2014 |
| JP | 2018-088568 | 6/2018 |

* cited by examiner

*Primary Examiner* — Dung D Tran
(74) *Attorney, Agent, or Firm* — Lex IP Meister, PLLC

(57) ABSTRACT

In the image processing apparatus according to the present disclosure, a data processing unit derives a density variation component for at least one modulation period from a difference between a reference plate reading value when the illumination is turned off, a reference plate reading value when the illumination is turned on, and black reference data and white reference data in synchronization with modulation of the SS clock, and corrects the image data with the density variation component. The white reference data indicates the light distribution of the illumination in the main scanning direction, and the data processing unit corrects the density variation component on the basis of the difference between the white reference data and the black reference data, and corrects the image data with the corrected density variation component.

4 Claims, 3 Drawing Sheets

IMAGE PROCESSING APPARATUS

INCORPORATION BY REFERENCE

This application is based upon and claims the benefit of priority from the corresponding Japanese Patent Application No. 2020-19060 filed on Feb. 6, 2020, the entire contents of which are incorporated herein by reference.

BACKGROUND

The present disclosure relates to an image processing apparatus.

When an image is read using an image sensor, an output signal of the image sensor is sampled and held at sample hold timing to generate an analog image signal.

An image processing apparatus uses a spread spectrum clock generator (SSCG) in order to suppress unnecessary radiation, extracts a noise component of line image data caused by spread spectrum in the line image data which deteriorates the image quality, and corrects the pixel data so that the noise component is suppressed based on the value of the noise component (For example, see Patent Document 1). Specifically, in synchronization with the modulation period signal of the SSCG, the image processing apparatus extracts a density variation component for one modulation period from the difference between the reference plate reading value at the time of turning off the illumination and the reference plate reading value at the time of turning on the illumination and the data of the black reference value and the white reference value, and corrects the image data at the time of image reading with the density variation component.

Another image processing apparatus generates correction data based on the relative ratio of the values of the lateral data obtained from the two lateral regions of the white reference member to the difference in the reading period between the reading of the white reference member and the reading of the document due to the fluctuation of the frequency of the spread spectrum clock, and corrects the image data based on the correction data.

SUMMARY

An image processing apparatus according to this disclosure includes: an image sensor, illumination, an SSCG circuit, an analog front end, a channel synthesizing circuit, and a data processing unit. The image sensor detects an image of a document or a reference plate. The illumination irradiates the document or the reference plate with light. The SSCG circuit generates an SS clock obtained by modulating a reference clock by spread spectrum of a prescribed modulation period. The analog front end samples and holds an output signal of the image sensor by a sampling clock generated from the SS clock to generate sampling data. The channel synthesizing circuit converts the sampling data into image data. The data processing unit processes the image data by a pixel clock generated based on the SS clock. The data processing unit derives a density variation component for at least one modulation period from a difference between a reference plate reading value when the lighting is turned off and a reference plate reading value when the lighting is turned on and black reference data and white reference data in synchronization with the modulation of the SS clock, and corrects the image data by the density variation component. The white reference data indicates the light distribution of the illumination in the main scanning direction, and the data processing unit corrects the density variation component on the basis of the difference between the white reference data and the black reference data, and corrects the image data with the corrected density variation component.

DETAILED DESCRIPTION

Hereinafter, embodiments of the present disclosure will be described with reference to the drawings.

Figure 1:
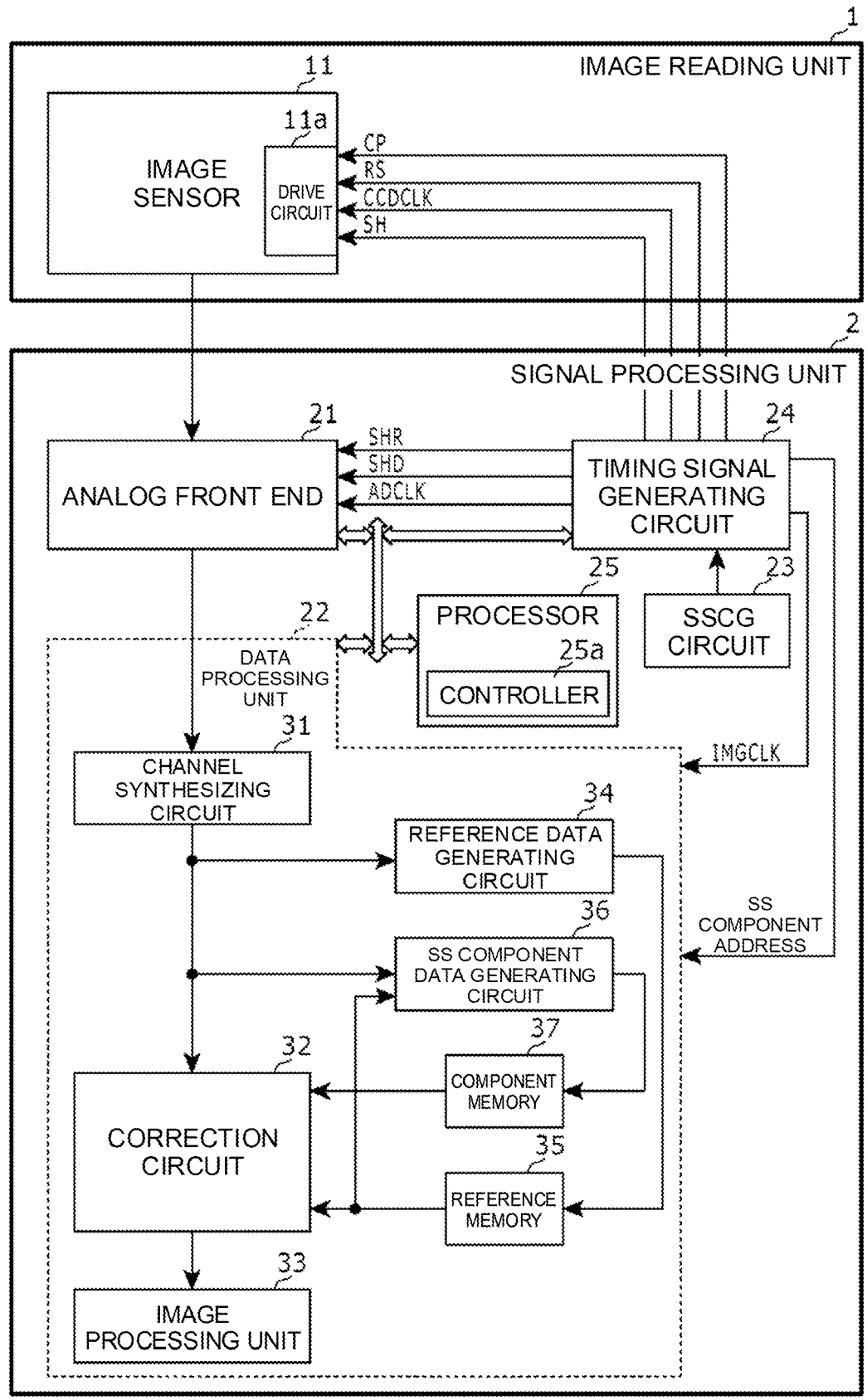
FIG. 1 is a block diagram showing a configuration of an image processing apparatus according to an embodiment of the present disclosure.

FIG. 1 is a block diagram showing a configuration of an image processing apparatus according to an embodiment of the present disclosure. In this embodiment, the image processing apparatus shown in FIG. 1 is an image reading apparatus such as a scanner or a multifunction device, and includes an image reading unit 1 and a signal processing unit 2.

The image reading unit 1 includes an image sensor 11. The image sensor 11 is driven by the drive circuit 11a in accordance with drive signals such as the clamp signal CP, the reset signal RS, the clock CCDCLK, and the shift pulse SH, receives an image of a document or a reference plate, and outputs an electric signal corresponding to the document image.

Figure 2:
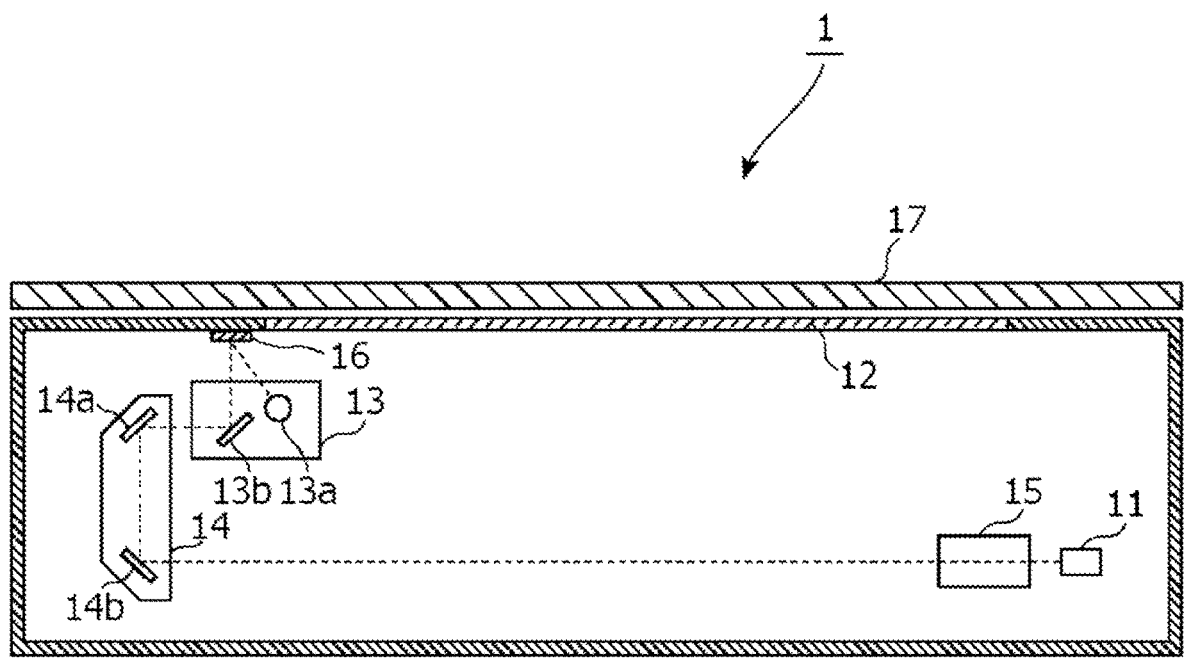
FIG. 2 is a side view showing the internal configuration of the image reading unit 1 in FIG. 1.

FIG. 2 is a side view showing the internal configuration of the image reading unit 1 in FIG. 1. As shown in FIG. 2, the image reading unit 1 includes, in addition to the image sensor 11, a contact glass 12, carriages 13 and 14, an imaging lens 15, a reference plate 16, and a document cover 17. The contact glass 12 is installed on the upper surface of the main body of the image reading unit 1, and a document is placed thereon. The carriage 13 is movable in the sub-scanning direction by a driving source (not shown). The carriage 13 has a light source 13a (illumination) and a mirror 13b for outputting the irradiation light to the document or the reference plate. The light source 13a is, for example, a plurality of light emitting diodes arranged in the main scanning direction. The light emitted from the light source 13a is reflected by a reference plate 16, a document placed on the contact glass 12, or the like according to the position of the carriage 13. The mirror 13b is an optical system that reflects light reflected from the reference plate 16, a document, etc., and emits it toward the carriage 14 in a predetermined direction. The carriage 14 reflects the light from the mirror 13b by the mirrors 14a and 14b and outputs the reflected light to the imaging lens 15. The imaging lens 15 images the light from the carriage 14 onto the image sensor 11.

The image sensor 11 receives the reflected light of the light emitted from the light source 13a through a predetermined optical system (here, mirrors 13b, 14a, 14b and an imaging lens 15). The image sensor 11 outputs an electric signal corresponding to the amount of light received for the plurality of pixels for each line. In this embodiment, as the image sensor 11, CCD (Charge Coupled Device), CIS (CMOS Image Sensor), and the like are used.

The reference plate 16 is a plate-like member which is disposed on the top surface of the apparatus in the main scanning direction and is used for acquiring black and white reference data.

Returning to FIG. 1, the signal processing unit 2 includes an analog front end (AFE) 21, a data processing unit 22, an SSCG circuit 23, a timing signal generating circuit 24, and a processor 25. The data processing unit 22 includes a channel synthesizing circuit 31, a correction circuit 32, an image processing unit 33, a reference data generating circuit 34, a reference memory 35, an SS component data generating circuit 36, and a component memory 37.

Analog front end (AFE) 21 is a circuit that performs sample hold, AGC (automatic gain control), and A/D (Analog to Digital) conversion.

The AFE 21 samples and holds the output signal of the image sensor 11 at a timing designated by a sampling clock generated from the SS clock to be described later, and generates and outputs output data.

In this embodiment, the AFE 21 operates as a sample-and-hold unit for sample-holding an output signal of the image sensor 11, and performs sample-and-hold by a CDS (Correlated Double Sampling) method. Specifically, the AFE 21 samples two values according to the reset sampling clock SHR and the data sampling clock SHD, and outputs a difference between the two values.

The data processing unit 22 operates on the pixel clock IMGCLK generated based on the SS clock described later, converts the output data into image data, and performs predetermined data processing on the image data. The pixel clock IMGCLK is generated by multiplying and dividing the SS clock.

The data processing unit 22 corrects the image data so as to suppress the SS component caused by the periodic variation of the SS clock.

Specifically, in synchronization with the modulation of the SS clock, the data processing unit 22 derives a density variation component for one modulation period from the difference between the reference plate reading value when the illumination is turned off, the reference plate reading value when the illumination is turned on, and the black reference data and the white reference data, and corrects the image data by the density variation component. Here, an SS component address n is generated in synchronization with the SS clock, and a concentration variation component is derived for each SS component address n.

The white reference data indicates the light distribution (That is, the light quantity distribution of the illumination in the main scanning direction) of the illumination in the main scanning direction, and the data processing unit 22 corrects the density variation component based on the difference between the white reference data and the black reference data, and corrects the image data with the corrected density variation component.

An SSCG circuit 23 oscillates a reference clock of a fixed period and generates a clock (SS clock) obtained by modulating the reference clock by spread spectrum of a prescribed modulation period. For example, the SSCG circuit 23 modulates a reference clock of 40 MHz with a modulation period of 2000 clock cycles and a modulation rate of center spread±1% to generate an SS clock.

The timing signal generating circuit 24 generates, based on the SS clock, a drive signal to be supplied to the drive circuit 11a and a clock signal to be supplied to the AFE 21 (sampling clock SHR, SHD, clock ADCLK for specifying timing of A/D conversion, etc.). For example, the timing signal generating circuit 24 multiplies and/or divides the SS clock by a predetermined multiplication setting value and/or a division setting value to generate the drive signal and the clock signal such as the pixel clock IMGCLK The processor 25 is provided with a CPU (Central Processing Unit), a ROM (Read Only Memory), a RAM (random access memory), etc., and operates as various processing units by loading a program from a ROM or a storage device not shown into the RAM and executing it by the CPU. Here, the processor 25 operates as the controller 25a. The controller 25a sets the offset and gain of the AFE 21.

In the data processing unit 22, the channel synthesizing circuit 31 changes the order of the output data of the AFE 21 and outputs image data as RGB data along the scanning order.

The correction circuit 32 performs SS component correction and shading correction on the image data to suppress an error component (hereinafter referred to as SS component) caused by a cycle variation of the SS clock to be described later.

The image processing unit 33 performs predetermined image processing on the corrected image data of the correction circuit 32 as necessary.

A reference data generating circuit 34 generates reference data on the basis of image data when the reference plate 16 is read and stores it in a reference memory 35. An SS component data generating circuit 36 generates SS component data (that is, data indicating the SS component) based on image data and reference data when the reference plate 16 is read, and stores them in a component memory 37. A correction circuit 32 corrects the image data by using the reference data and the component data.

Specifically, the correction circuit 32 uses the first reference plate reading value obtained by the image sensor 11 reading the reference plate 16 in the lighting off state and the second reference plate reading value obtained by the image sensor 11 reading the reference plate 16 in the lighting on state to correct the image data together so as to suppress the SS component in the shading correction.

For example, the reference data generating circuit 34 generates black reference data (x) and white reference data (x), which will be described later, and writes them into the reference memory 35, and the SS component data generating circuit 36 generates black SS component data (n) and white SS component data (n), which will be described later, as density variation components caused by spread spectrum, and writes them into the component memory 37, and the correction circuit 32 derives corrected image data (x) from the image data (x) before correction based on the black reference data (x) and white reference data (x) in the reference memory 35, the black SS component data (n) and white SS component data (n) in the component memory 37, and the like, as described later.

Black $SS$ component data $(n)$=AVE$n$[First reference plate reading $(x)$−Black reference data $(x)$]

White $SS$ component data $(n)$=AVE$n$[{Second reference plate reading $(x)$−White reference data $(x)$−Black $SS$ component data $(n)$}×FIX/(White Reference Data $(x)$−Black Reference Data $(x)$)]

White correction value $(x)$=white $SS$ component data $(n)$×(White Reference Data $(x)$−Black Reference Data $(x)$)/FIX Corrected image data $(x)$={Image data before correction $(x)$−(Black reference data $(x)$−Black $SS$ component data $(n)$)}/{White reference data $(x)$+white correction value $(x)$−black reference data $(x)$}×maximum output data value n is the SS component address and has a value counted up from 0 in the modulation period by the pixel clock IMGCLK. The SS component address n is generated by the timing signal generating circuit 24 in synchronization with the pixel clock IMGCLK and supplied to the data processing unit 22 (correction circuit 32, SS component data generating circuit 36, etc.).

AVEn [ ] indicates an average value for a plurality of predetermined modulation periods for each SS component address n.

The black reference data (x) is a value obtained by averaging pixel values of a plurality of predetermined lines when the reference plate 16 is read in the lighting off state with respect to the main scanning pixel position x.

The white reference data (x) is a value obtained by averaging pixel values of a plurality of predetermined lines when the reference plate 16 is read in the lighting on state with respect to the main scanning pixel position x.

The black reference data (x) and the white reference data (x) are also used as the black reference data and the white reference data for shading correction.

FIX is a predetermined fixed value, which is a maximum reading value (upper limit of the pixel value of the image data) here.

The number of SS component addresses n is, for example, the number of pixel clocks corresponding to the modulation period of the SSCG, and indicates the phase within the modulation period.

As described above, in this embodiment, the data processing unit 22 includes:
(a) deriving black SS component data and white SS component data from respective differences between a first reference plate reading value when illumination is turned off and a second reference plate reading value when illumination is turned on, and the black reference data and white reference data for each data for generating the SS component, and deriving the magnitude of a reading value affected by light distribution at a main scanning pixel position, from the difference between the black reference data and the white reference data; (b) correcting white SS component data generated by the magnitude of a read value of each main scanning pixel position, to a specific read value (for example, the maximum reading value of the image data); (c) deriving an average of white SS component data corrected to a specific reading value at each SS component address in a predetermined plurality of modulation periods; (d) when the image data is corrected, generating a white correction value from the white SS component data so as to match the read value (difference between white reference data and black reference data) of the image data to be corrected; and (e) correcting the image data based on the correction value.

Specifically, as described above, the data processing unit 22 includes: (a) deriving a ratio of a difference (magnitude of the read value affected by light distribution at the main scan pixel location) between the white reference data and the black reference data to a maximum read value (FIX described above) of the image data; (b) deriving white SS component data of the maximum read value of the image data by dividing the white SS component data by the ratio; (c) deriving the average of the white SS component data of the maximum read value at each SS component address in a predetermined plurality of modulation periods; (d) when the image data is corrected, calculating a white correction value is by multiplying the white SS component data by the ratio of the read value (difference between white reference data and black reference data) of the image data to be corrected to the maximum read value of the image data; and (e) correcting the image data based on the correction value. In this case, the data processing unit 22 corrects the density variation component based on the difference between the white reference data and the black reference data, and also performs shading correction when correcting the image data with the corrected density variation component.

Figure 3:
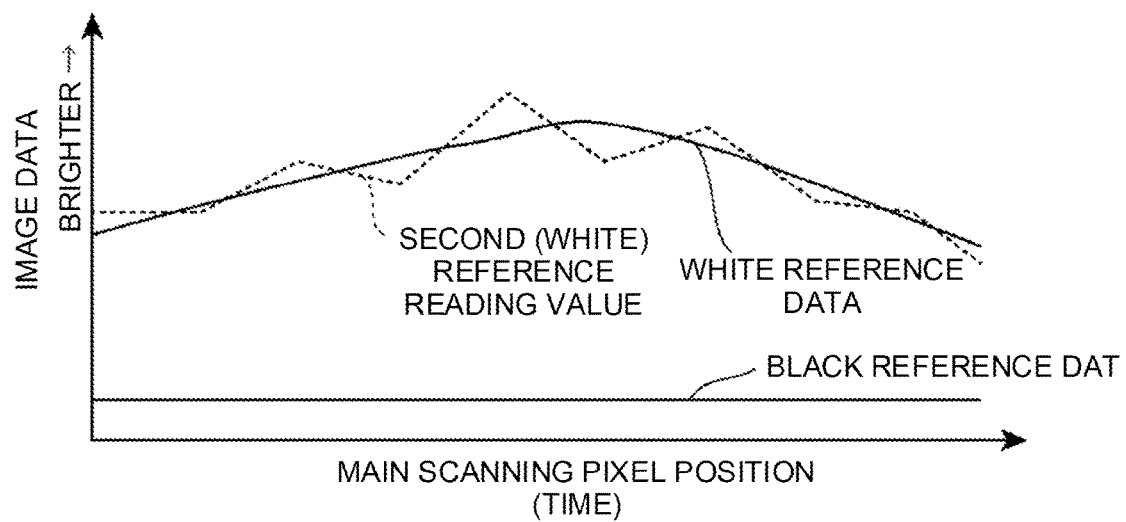
FIG. 3 is a diagram for explaining correction of line density variation components in the image processing apparatus shown in FIG. 1.
Figure 3:
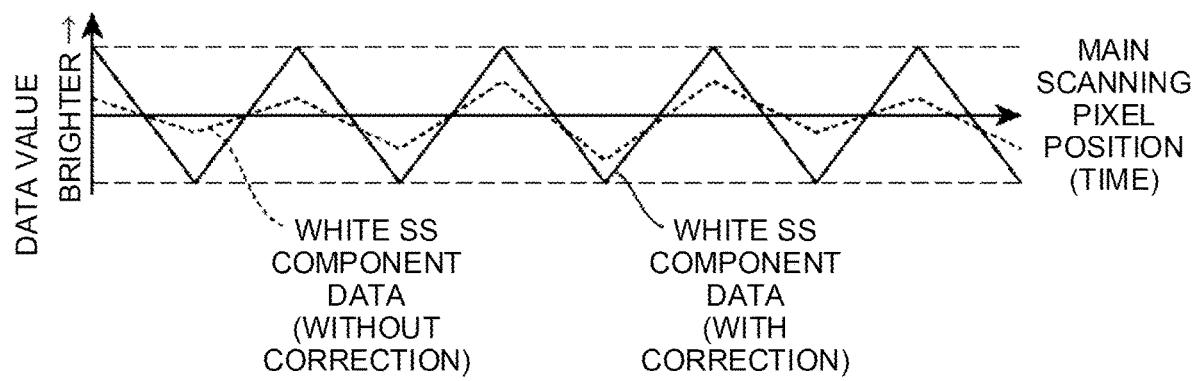

FIG. 3 is a diagram for exploding correction of line density variation components in the image processing apparatus shown in FIG. 1. For example, as shown in FIG. 3, by correcting the line density variation component (white SS component data in FIG. 3), a density variation component obtained by averaging the line density variation components for a plurality of lines can be appropriate obtained from the line density variation components for a plurality of lines without being affected by non-uniform light distribution of illumination appearing in the white reference data.

Next, the operation of the image processing apparatus will be described.

The image sensor 11 outputs an electric signal corresponding to a read image (document image, an image of the reference plate 16, etc.) for each line. The AFE 21 samples and holds the output signal of the image sensor 11 at the timing designated by the sampling clock generated from the SS clock by the timing signal generating circuit 24, and generates and outputs output data. The channel synthesizing circuit 31 changes the order of the output data of the AFE 21 and outputs the image data along the scanning order.

First, the reference data and the SS component data are acquired by image reading of the reference plate 16 as described above.

Thereafter, at the time of reading the image of the document, the correction circuit 32 repeats the SS component correction corresponding to each SS address n using the reference data and the SS component data as described above, and executes the SS component correction on the image data of the document together with the shading correction, and the image processing unit 33 executes predetermined image processing on the corrected image data and outputs the corrected image data.

As described above, according to the embodiment, in synchronization with the modulation of the SS clock, the data processing unit 22 derives a density variation component for at least 1 modulation period from the difference between the reference plate reading value at the time of turning off the illumination and the reference plate reading value at the time of turning on the illumination, and the black reference data and the white reference data, and corrects the image data by the density variation component. The white reference data indicates the light distribution of the illumination in the main scanning direction, and the data processing unit 22 corrects the density variation component on the basis of the difference between the white reference data and the black reference data, and corrects the image data with the corrected density variation component.

Thus, since the distribution of the concentration variation component in the main scanning direction is specified without being affected by the uneven light distribution of the illumination, the deterioration of image quality due to the spread spectrum is suppressed.

Various changes and modifications to the above-described embodiments will be apparent to those skilled in the art. Such changes and modifications may be made without departing from the spirit and scope of the subject matter and without diminishing the intended advantages. That is, such changes and modifications are intended to be included in the claims.

For example, in the above embodiment, although the density variation component for 1 modulation period is derived, the density variation component for a correction period obtained by multiplying the modulation period by a predetermined integer (2 or more) may be derived, and the image data may be repeatedly corrected by the correction data for the correction period. In this case, the predetermined integer is set so that there is no fraction in the number of clocks of the pixel clock in the correction period. That is, in a case where a fraction occurs in the number of clocks of the pixel clock IMGCLK per modulation period (when the sum of the periods of successive pixel clocks IMGCLK is not equal to the modulation period), a period that is an integral multiple of the modulation period such that the fraction disappears is set as a correction period.

What is claimed is:

1. An image processing apparatus comprising:
   an image sensor for detecting an image of a document or a reference plate;
   an illumination for irradiating the document or the reference plate with light;
   an SSCG circuit for generating an SS clock in which a reference clock is modulated by spread spectrum of a predetermined modulation period;
   an analog front end for generating sampling data by sampling and holding an output signal of the image sensor with a sampling clock generated from the SS clock;
   a channel synthesizing circuit for converting the sampling data into image data; and
   a data processing unit for processing the image data with a pixel clock generated based on the SS clock; wherein
   the data processing unit derives a density variation component for at least one modulation period from a reference plate reading value at the time of turning off of the illumination, a reference plate reading value at the time of turning on of the illumination, and black reference data and white reference data, in synchronization with the modulation of the SS clock, and corrects the image data with the density variation component,
   the white reference data indicates light distribution of the illumination in a main scanning direction,
   the data processing unit corrects the density variation component based on a difference between the white reference data and the black reference data, and the image data is corrected with the corrected density variation component.

2. The image processing apparatus according to claim 1, wherein
   the data processing unit:
   (a) for each line, derives a line density variation component from a difference between a reference plate reading value when the illumination is turned off and a reference plate reading value when the illumination is turned on, and the black reference data and the white reference data;
   (b) corrects the line density variation component by dividing the line density variation component by the difference between the white reference data and the black reference data;
   (c) derives an average of the line density variation components after correction in a predetermined plurality of lines;
   (d) multiplies the average by the difference between the white reference data and the black reference data to generate a correction value of the image data; and
   (e) corrects the image data based on the correction value.

3. The image processing apparatus according to claim 2, wherein
   the data processing unit:
   (a) derives a ratio between a maximum reading value of the image data and the difference between the white reference data and the black reference data;
   (b) corrects the line density variation component by dividing the line density variation component by the ratio;
   (c) derives an average of the corrected line density variation components in a predetermined plurality of lines;
   (d) multiplies the average by the ratio to generate a correction value of the image data; and
   (e) corrects the image data based on the correction value.

4. The image processing apparatus according to claim 1, wherein
   the data processing unit corrects the density variation component based on the difference between the white reference data and the black reference data, and performs shading correction when correcting the image data with the corrected density variation component.

* * * * *